United States Patent
Hummel

(10) Patent No.: US 11,305,632 B2
(45) Date of Patent: Apr. 19, 2022

(54) HYBRID DRIVETRAIN FOR A HYBRID MOTOR VEHICLE

(71) Applicant: AUDI AG, Ingolstadt (DE)

(72) Inventor: Steffen Hummel, Flacht (DE)

(73) Assignee: AUDI AG, Ingolstadt (DE)

( * ) Notice: Subject to any disclaimer, the term of this patent is extended or adjusted under 35 U.S.C. 154(b) by 186 days.

(21) Appl. No.: 16/630,641

(22) PCT Filed: Sep. 5, 2018

(86) PCT No.: PCT/EP2018/073852
§ 371 (c)(1),
(2) Date: Jan. 13, 2020

(87) PCT Pub. No.: WO2019/048468
PCT Pub. Date: Mar. 14, 2019

(65) Prior Publication Data
US 2020/0148054 A1    May 14, 2020

(30) Foreign Application Priority Data
Sep. 6, 2017   (DE) .................. 10 2017 215 673.2

(51) Int. Cl.
*B60K 6/48*        (2007.10)
*B60K 6/365*       (2007.10)
(Continued)

(52) U.S. Cl.
CPC .............. *B60K 6/48* (2013.01); *B60K 6/365* (2013.01); *F16H 3/006* (2013.01); *B60K 6/547* (2013.01);
(Continued)

(58) Field of Classification Search
CPC ........... F16H 3/006; B60K 6/48; B60K 6/365; B60K 6/547
(Continued)

(56) References Cited

U.S. PATENT DOCUMENTS 8,051,732 B2 * 11/2011 Gitt ..................... F16H 37/046
                                                   74/331
8,182,388 B2 *  5/2012 Gumpoltsberger ..... F16H 3/006
                                                  475/330
(Continued)

FOREIGN PATENT DOCUMENTS

DE    102004042007 A1    3/2006
DE    102010008754 A1    8/2011
(Continued)

OTHER PUBLICATIONS

German Examination Report dated Jul. 17, 2018 in corresponding German Application No. 10 2017 215 673.2; 14 pages; Machine translation attached.
(Continued)

*Primary Examiner* — Ha Dinh Ho
(74) *Attorney, Agent, or Firm* — Maier & Maier, PLLC

(57) ABSTRACT

A hybrid drivetrain for a hybrid powered vehicle, having an electric machine and a combustion engine, whose power output shaft acts in alternating manner either on a first input shaft or on a coaxial second input shaft of a dual clutch transmission across two separating clutches of a dual clutch, wherein a respective first and second subtransmission can be activated using the input shafts, and wherein fixed and idler gearwheels are arranged in wheel planes on the two input shafts and a common axially parallel driven shaft, said fixed and idler gears being combined into gear sets which form gear stages, in which the idler gearwheels can be coupled to the shafts by means of gear-shifting elements.

20 Claims, 4 Drawing Sheets

(51) Int. Cl.
*B60K 6/547* (2007.10)
*F16H 3/00* (2006.01)

(52) U.S. Cl.
CPC ............... *B60K 2006/4808* (2013.01); *F16H 2200/0056* (2013.01)

(58) Field of Classification Search
USPC ..................................... 74/330, 661, 665 L
See application file for complete search history.

(56) References Cited

U.S. PATENT DOCUMENTS

| | | | |
|---|---|---|---|
| 10,724,617 B2 * | 7/2020 | Blattner | F16H 61/70 |
| 2010/0192717 A1 * | 8/2010 | Gitt | F16H 3/006 74/330 |
| 2014/0171259 A1 | 6/2014 | Genise | |
| 2015/0292606 A1 * | 10/2015 | Lubke | B60W 10/111 74/661 |

FOREIGN PATENT DOCUMENTS

| | | |
|---|---|---|
| DE | 102012203365 A1 | 9/2013 |
| DE | 102012219125 A1 | 4/2014 |
| DE | 102014110221 A1 | 6/2015 |
| DE | 102014223339 A1 | 5/2016 |
| DE | 102015201458 A1 | 8/2016 |

OTHER PUBLICATIONS

International Search Report with English translation and Written Opinion with Machine translation dated Nov. 22, 2018 in corresponding International Application No. PCT/EP2018/073852; 19 pages.

English-language translation of International Preliminary Report on Patentability dated Mar. 19, 2020, in corresponding International Application No. PCT/EP2018/073852; 10 pages.

German Office Action dated Aug. 18, 2021, in connection with corresponding DE Application No. 10 2017 215 373.2 (11 pp., including machine-generated English translation).

* cited by examiner

HYBRID DRIVETRAIN FOR A HYBRID MOTOR VEHICLE

FIELD

The disclosure relates to a hybrid drivetrain for a hybrid powered motor vehicle.

BACKGROUND

Such a hybrid drivetrain may comprise a drivetrain generator, such as a 48 V electric machine, which is designed for a pure electric motor driving operation as well as a recuperation. The recuperated energy may optionally be summoned up via the onboard vehicle network for an electronic air conditioning compressor, for example.

From DE 10 2012 203 365 A1 there is known a hybrid drivetrain of this kind having an electric machine and a combustion engine. Its power output shaft acts in alternating manner on a first input shaft and on a coaxial second input shaft of a dual clutch transmission across two separating clutches of a dual clutch, by which a respective subtransmission can be activated. Respective fixed and idler gearwheels are arranged on the two input shafts and a common axially parallel driven shaft in wheel planes, being combined into gear sets which form gear stages. In the gear sets, the idler gearwheels can be coupled to the above shafts by means of shifting elements. The electric machine may act directly on the driven shaft an intermediate gear. Furthermore, a shifting element on the electric machine side is interposed between the electric machine and the cooperating driven shaft. The shifting element on the electric machine side couples the electric machine to the driven shaft of the dual clutch transmission in a first shift position. On the other hand, in a neutral position of the shifting element, the electric machine is decoupled from the dual clutch transmission in terms of driving.

Furthermore, the dual clutch transmission in DE 10 2012 203 365 A1 comprises further shifting elements by means of which the electric machine can be coupled to the first and second input shaft and/or to further intermediate gear shafts of the dual clutch transmission.

SUMMARY

The problem which the invention proposes to solve is to provide a hybrid drivetrain in which the electric machine can be coupled in various ways to the dual clutch transmission in an easier and more design space favorable manner as compared to the prior art.

The problem is solved by the features of claim 1. Preferred modifications of the invention are disclosed in the dependent claims.

The shifting element on the electric machine side can not only couple the electric machine to the driven shaft in a first shift position and decouple the electric machine from the dual clutch transmission in a neutral position. In addition, the shifting element on the electric machine side can also be shifted into a second shift position in which the electric machine is coupled to one of the input shafts (hereinafter called the input shaft on the electric machine side) and at the same time decoupled from the driven shaft of the dual clutch transmission.

In this way, the electric machine can be connected to the dual clutch transmission both at the wheel side (i.e., to the driven shaft on the output side) and at the drive side (i.e., to one of the input shafts of the dual clutch transmission), and also it can be completely decoupled from it, and this in a simple and space-saving design with precisely only one shifting element.

In one technical implementation, the intermediate gear of the electric machine may comprise a gear set separate from all the gear stages, preferably a planetary gear stage and/or a spur gear stage. The shifting element on the electric machine side may be arranged directly on the driven shaft. It is favorable to the design space when the shifting element on the electric machine side can be shifted from its neutral position, looking in the axial direction, both ways into the first shift position or into the second opposite shift position.

In another technical implementation, the shifting element on the electric machine side may directly adjoin in the axial direction a wheel plane (hereinafter called the wheel plane on the electric machine side), forming a gear stage. This may comprise an idler gear on the output side, mounted rotatably on the driven shaft. The idler gear on the output side of the wheel plane on the electric machine side is coupled to the driven shaft by means of a gear-shifting element (likewise mounted on the driven shaft) for a traditional gear shifting.

In addition, the output-side idler gear of the wheel plane on the electric machine side also provides the electric machine connection to the input shaft on the electric machine side (that is, the first input shaft): in this case, the output-side idler gear of the wheel plane on the electric machine side is coupled to the electric machine by means of the shifting element on the electric machine side (located in the second shift position). In regard to a compact arrangement, it is preferably for the above gear-shifting element and the shifting element on the electric machine side to be positioned on axially opposite sides of the output idler gear of the wheel plane on the electric machine side.

In the aforementioned dual clutch transmission, the first subtransmission and the second subtransmission are arranged preferably next to each other in the axial direction. The first subtransmission may be spaced axially apart from the dual clutch with the second subtransmission interposed in between them. The first input shaft in this case may be a solid input shaft, arranged coaxially inside the second input shaft, which is designed as a hollow input shaft. Preferably, all odd-numbered forward gears may be assigned to the first subtransmission, while all even-number forward gears may be assigned to the second subtransmission, being shiftable by corresponding shifting elements.

For example, the dual clutch transmission may be a known seven gear shifting transmission, in which for example the wheel plane situated in the first subtransmission works as a wheel plane on the electric machine side for the seventh gear stage, for the fifth gear stage, for the third gear stage or for the first gear stage, which can be coupled to the intermediate gear of the electric machine.

The shifting element on the electric machine side may be arranged in favorable design space manner between an outer wheel plane forming a gear stage in the axial direction (that is, the wheel plane on the electric machine side) and the intermediate gear of the electric machine.

In the above dual clutch transmission, all the wheel planes may be arranged axially in succession, the dual clutch being arranged on an axially outer end of the transmission and the electric machine, optionally together with the intermediate gear, may be arranged on an axially opposite outer end of the transmission.

In regard to a favorable design space arrangement, preferably the electric machine is arranged with its electric machine shaft coaxial to the input shaft on the electric machine side or coaxial to the common driven shaft of the dual clutch transmission. The electric machine shaft may be realized as a hollow shaft, which is coaxially mounted on the input shaft on the electric machine side or on the common driven shaft.

The intermediate gear in a first variant embodiment may comprise a planetary gear stage with a sun wheel and a radially outer ring gear and planet gears arranged in between.

The surrounding rotor of the electric machine may be fixed in rotation to the electric machine shaft by a drive flange in customary practice. Besides the drive flange, a sun wheel of the intermediate gears planetary transmission may also be fixed in rotation on the electric machine shaft. In this case, the radially outer ring gear of the planetary gear stage may be fixed to the housing, and the arm carrying the planet gears may be coupled either to the input shaft on the electric machine side or to the driven shaft.

BRIEF DESCRIPTION OF THE DRAWINGS

In the following, exemplary embodiments of the invention are described with the aid of the accompanying figures. There are shown.

DETAILED DESCRIPTION

Figure 1:
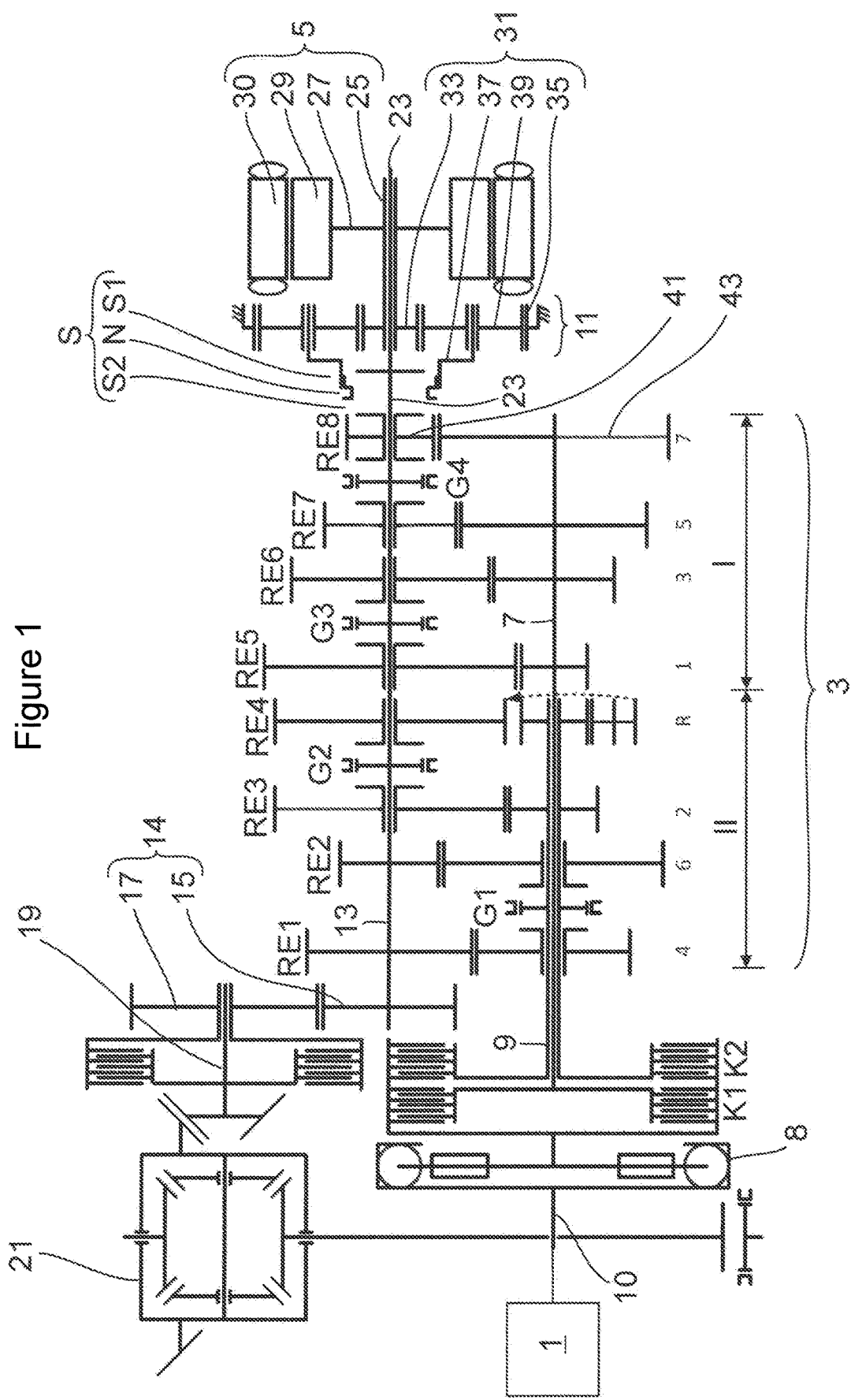
FIG. 1 a transmission structure of the dual clutch transmission according to a first exemplary embodiment.

FIG. 1 shows a hybrid drivetrain for a hybrid powered vehicle, composed substantially of a combustion engine 1, a dual clutch transmission 3 and an electric machine 5. The dual clutch transmission 3 comprises a first input shaft 7 and a second input shaft 9, which are arranged coaxially and which can be connected in alternation and transmitting torque to a combustion engine shaft 10 across two hydraulically operated multi-disk clutches K1, K2, for example, across a torsional vibration dampener 8 located in front of them. The first input shaft 7 is realized in FIG. 1 as a solid shaft, being led coaxially inside the second input shaft 9, realized as a hollow shaft.

The dual clutch transmission 3 in FIG. 1 comprises, for example, seven forward gears and one reverse gear. These are realized in wheel planes RE1 to RE8 by corresponding gear sets, each time with one idler gear and one fixed gear, which can be shifted in known manner via a total of four gear-shifting elements G1 to G4 (that is, dual synchronous clutches, for example). The output gears of the wheel planes RE1 to RE8 forming the gear stages are all arranged on a common axially parallel driven shaft 13. The driven shaft 13 drives a drive shaft 19 of an axle differential 21 across a gear stage 14 with spur gears 15, 17.

By means of the first and second input shaft 7, 9 a first subtransmission I and a second subtransmission II of the dual clutch transmission 3 can be activated respectively. The first subtransmission I is associated with all the odd-numbered forward gears 1, 3, 5, 7, while the second subtransmission II is associated with all the even-numbered forward gears 2, 4, 6 and a reverse gear R. Accordingly, the odd-numbered forward gears 1, 3, 5, 7 can be activated by the first input shaft 7 and by means of the first separating clutch K1. On the other hand, the even-numbered forward gears 2, 4, 6 of the second subtransmission II and its reverse gear can be activated by the hollow second input shaft 9 and by means of the second separating clutch K2.

The first subtransmission I in FIG. 1, looking in the axial direction, is axially spaced apart from the dual clutch K1, K2 with the subtransmission II interposed in between, being situated in FIG. 1 at the left outer end of the transmission. On the opposite right axially outer end of the transmission of the dual clutch transmission 3 is positioned the electric machine 5. In front of the electric machine 5 there is situated an intermediate gear 11 for a torque transformation.

As is further shown by FIG. 1, the driven shaft 13 is prolonged in the axial direction beyond the first subtransmission I by an end piece 23, on which an electric machine shaft 25 realized as a hollow shaft is mounted coaxially. The electric machine hollow shaft 25 is rotationally fixed by a drive flange 27 to a rotor 29 of the electric machine 5, which in turn cooperates with a stator 30 of the electric machine 5. In FIG. 1, the intermediate gear 11 of the electric machine 5 comprises a planetary transmission 31, whose sun wheel 33 is rotationally fixed to the electric machine hollow shaft 25. The radially outer ring gear 35 is held fixed on the housing, while an arm 37 carrying the planet gears 39 can be coupled by a shifting element S at the electric machine side, mounted on the driven shaft 13, either to the first input shaft 7 (hereinafter also called the input shaft at the electric machine side) or to the driven shaft 13, or it can be completely decoupled from the dual clutch transmission 3.

As can be seen from FIG. 1, the shifting element S on the electric machine side can be shifted from its neutral position N in the axial direction both ways, either into a first shift position 51 or into a second opposite shift position S2. The shifting element S at the electric machine side, looking in the axial direction, is positioned between the intermediate gear 11 and an immediately adjoining wheel plane RE8 (that is, the wheel plane at the electric machine side), forming the seventh gear stage in FIG. 1. The wheel plane RE8 at the electric machine side comprises a output-side idler gear 41, rotationally mounted on the driven shaft 13 and intermeshing with a drive-side fixed gear 43 on the first input shaft 7 (at the electric machine side). For a traditional gear shifting, the output-side idler gear 41 can be coupled by means of an associated gear-shifting element G4 to the driven shaft 13.

In a dual function with such a traditional gear shifting, the output-side idler gear 41 of the wheel plane RE8 at the electric machine side is also additionally a component of a drive-side electric machine connection to the first input shaft 7 (at the electric machine side). For such an electric machine connection to the input shaft 7 at the electric machine side, the shifting element S at the electric machine side is shifted into its second shift position S2, in which the arm 37 of the planetary transmission 31 of the intermediate gear 11 is coupled to the output-side idler gear 41 of the wheel plane RE8 at the electric machine side.

Alternatively to this, in the first shift position 51 the arm 37 of the planetary transmission 31 of the intermediate gear 11 is coupled to the driven shaft 13, thereby producing an output-side connection of the electric machine to the driven shaft 13.

The above defined wheel-side and output-side connection of the electric machine (in the shift position 51 of the shifting element S at the electric machine side) has the following benefits: an optimal transmission ratio for the recuperation is assured in this way (operating point of the electric machine 5 in terms of performance and efficiency over a large speed range). Furthermore, good efficiency is assured for the recuperation (no drag losses of the separating clutches K1, K2 and the input shafts 7, 9 of the dual clutch transmission 3). Moreover, a boost operation is assured in a low torque range ("low torque end") and improved spontaneity in traction, even during traction downshifting or kickdown and multiple downshifting. Moreover, an energy-efficient driving operation is assured in the case of the wheel-side connection of the electric machine, since unnecessary transmission components, such as oil pumps, controller, transmission hydraulics, or shifting elements, can be deactivated (that is, switched off electrically). A further benefit of the above wheel-side connection of the electric machine is the constant availability of the electric machine 5, i.e., the activating of the electric machine 5 is not bound to the current gear in the dual clutch transmission 3. Furthermore, there is no conflict with preselection of the gears (even if these are not shifted). In this way, the usable/available portion of the drivetrain generator time is not curtailed. Neither is there any conflict with clutch adaptation (large inertia would make it harder to learn the kiss point of the clutch K1, K2).

The above defined drive-side connection of the electric machine (in the first shift position S2 of the shifting element S at the electric machine side) has the following benefits: an electric motor driving operation is made possible with the drive-side electric machine connection (for example, parking pilot, traffic jam pilot, electrical creep operation). Furthermore, a boost operation is assured in the low torque range ("boosting in the low torque end") and improved spontaneity during kickdown. Moreover, an optimal transmission ratio is made possible for the presentation of the driving functions (operating point of the electric machine 5 in terms of torque and performance at low driving speeds). Moreover, in sailing operation both a combustion engine starting and an assisted combustion engine starting as well as a cold start are made possible. Furthermore, the drive-side connection of the electric machine an assistance is possible during the synchronization in the dual clutch transmission. Moreover, multiple connection possibilities are provided from the first input shaft 7 to the driven shaft 13 (via 1st, 3rd, and 5th gear).

The decoupling of the electric machine 5 from the dual clutch transmission 3 (in the neutral position N of the shifting element S at the electric machine side) has the following benefits: the transmission ratio of the electric machine connection does not need to be designed for the maximum rpm of the combustion engine 1, so that there is no overspeeding of the electric machine 5 (1st gear+gear 1-2 jump). Moreover, the dual clutch transmission 3 can operate with optimal efficiency, since there is no "braking" inertia in the operating conditions in which the vehicle is not utilizing the electric machine 5 (freeway, battery SOC stop, cold weather, battery drained). Moreover, the driving operation is energy-efficient, since no self-synchronization is needed. Moreover, the workload of the synchronization is made easier by decoupling the inertia when the electric machine 5 is not available (SOC stop, battery drained, cold weather). Furthermore, there is a shorter braking distance thanks to the decoupling of the inertia in the case of full braking and less load on the service brake thanks to decoupling of the electric machine inertia (battery full, cold weather). Furthermore, the shifting is improved, i.e., gear scraping is reduced or prevented when shifting through after the free-flight phase.

Figure 2:
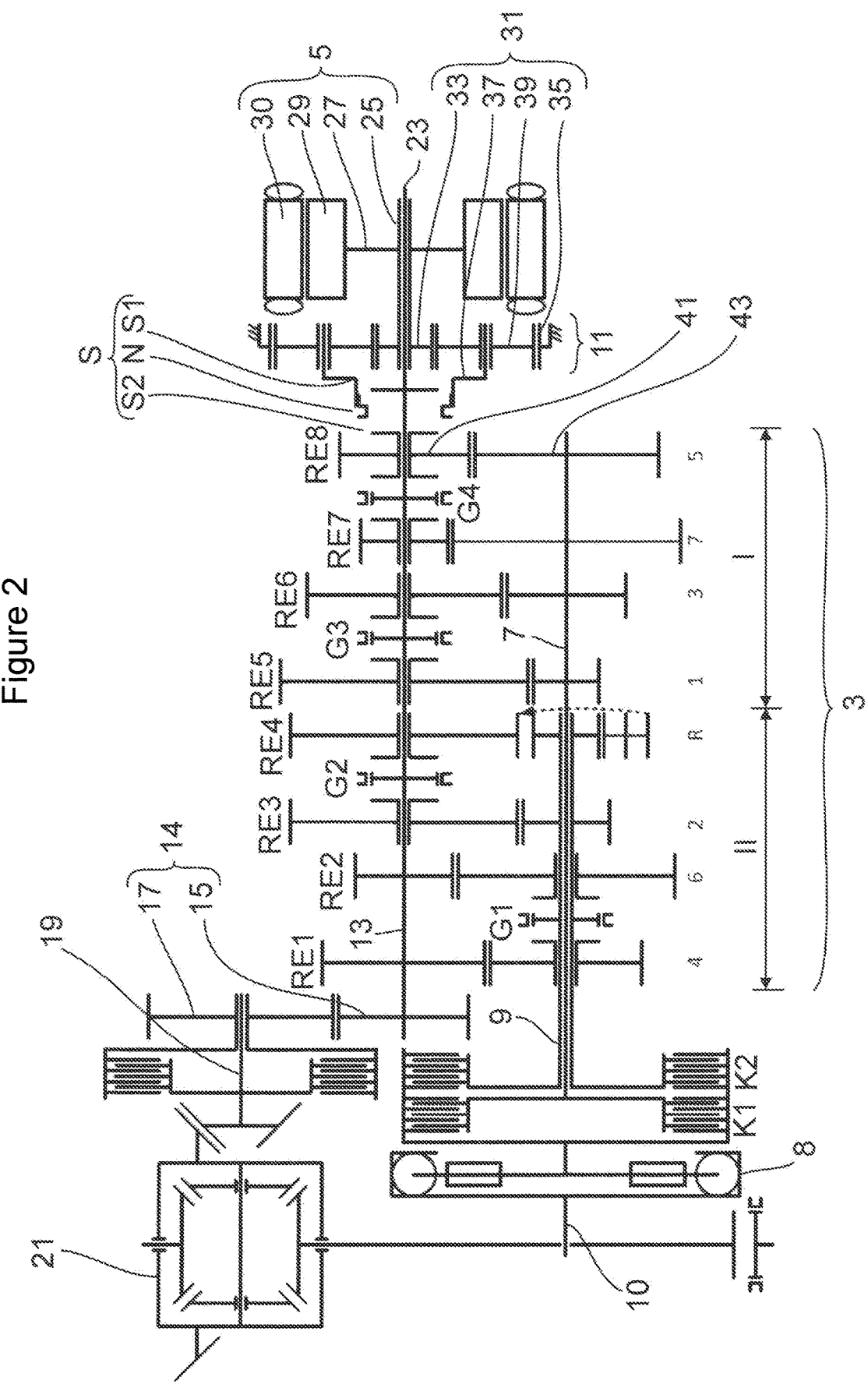
FIGS. 2 to 4 respective views corresponding to FIG. 1 of further exemplary embodiments of the invention.

FIG. 2 shows in one view corresponding to FIG. 1 a second variant embodiment which is substantially identical to the transmission structure 1 shown in FIG. 1. By contrast with FIG. 1, the wheel plane RE8 at the electric machine side in FIG. 2 does not form the seventh gear, but rather the fifth gear, while the seventh wheel plane RE7 forms the seventh gear. That is, the seventh and fifth gear stage in FIG. 2 have been interchanged in their positions.

Figure 3:
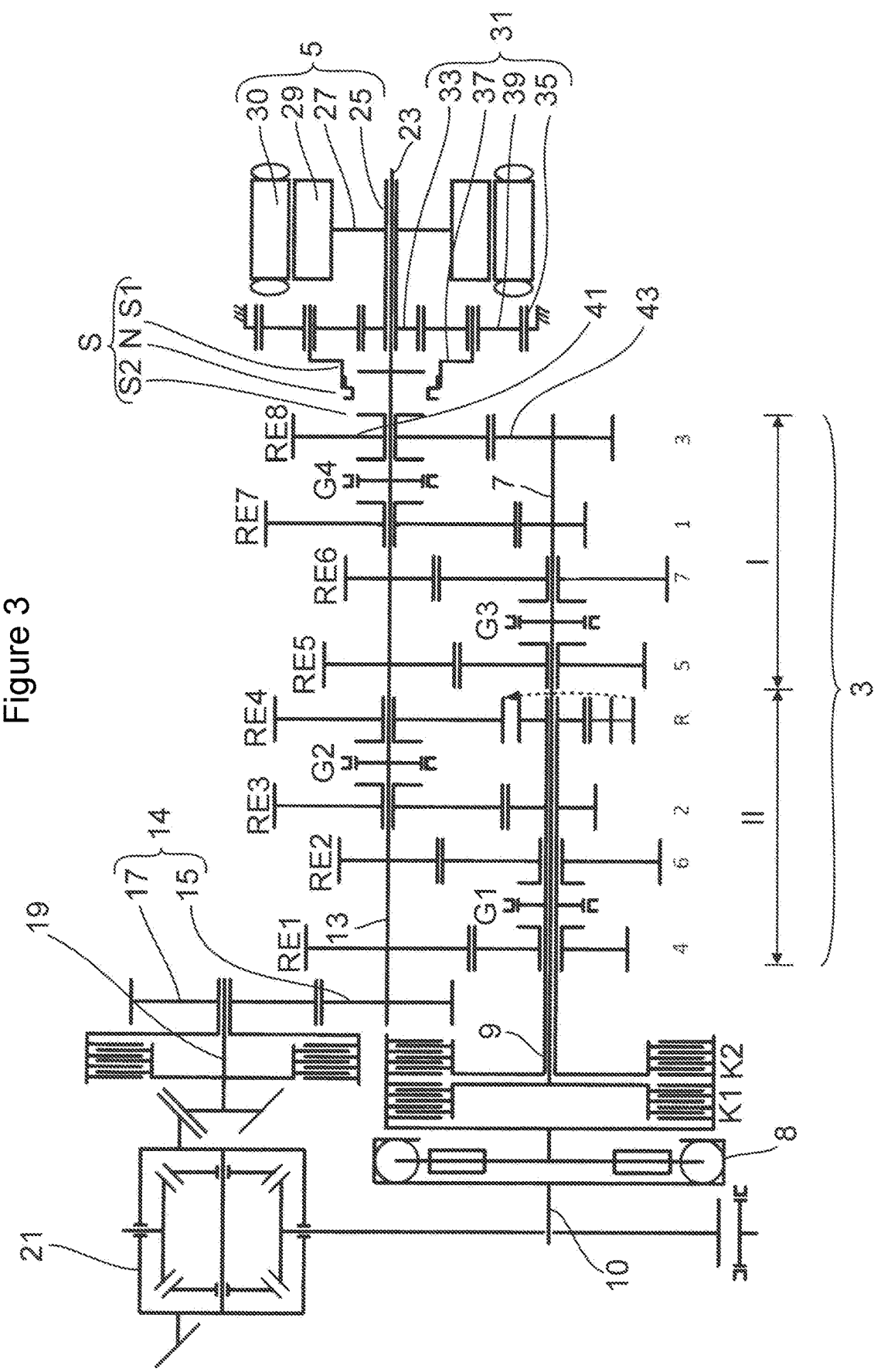

FIG. 3 shows in one view corresponding to FIG. 1 a third variant embodiment which is substantially identical to the transmission structure 1 shown in FIG. 1. By contrast with FIG. 1, the wheel plane RE8 at the electric machine side in FIG. 3 does not form the seventh gear, but rather the third gear, while the fifth wheel plane RE5 forms the fifth gear, the sixth wheel plane RE6 the seventh gear, and the seventh wheel plane RE7 the first gear.

Figure 4:
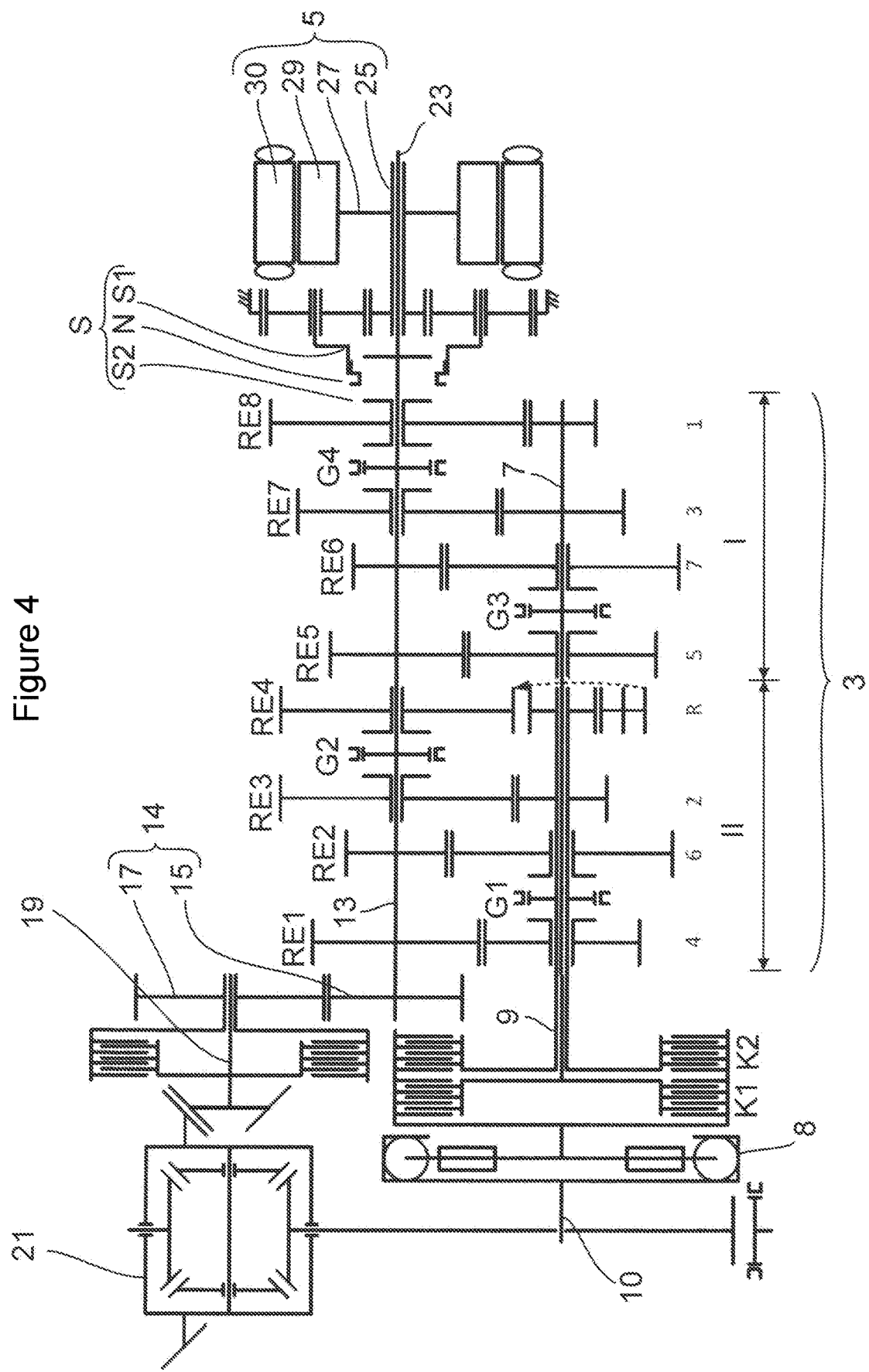

FIG. 4 shows in one view corresponding to FIG. 1 a fourth variant embodiment which is substantially identical to the transmission structure 1 shown in FIG. 1. By contrast with FIG. 1, the wheel plane RE8 at the electric machine side in FIG. 4 does not form the seventh gear, but rather the first gear, while the fifth wheel plane RE5 forms the fifth gear, the sixth wheel plane RE6 the seventh gear, and the seventh wheel plane RE7 the third gear.

The invention claimed is:

1. A hybrid drivetrain for a hybrid powered vehicle, comprising:
    an electric machine and a combustion engine, whose power output shaft acts in alternating manner either on a first input shaft or on a coaxial second input shaft of a dual clutch transmission across two separating clutches of a dual clutch,
    wherein a respective first and second subtransmission dare activatable using the input shafts,
    wherein fixed and idler gearwheels are arranged in wheel planes on each of the two input shafts, the wheel planes common to corresponding fixed and idler gearwheels provided on a driven shaft which is arranged in parallel with the two input shafts, said fixed and idler gearwheels being combined into gear sets which form gear stages, in which the idler gearwheels are coupleable to the shafts by gear-shifting elements,
    wherein the electric machine acts on the driven shaft optionally via an intermediate gear,
    wherein a shifting element on an electric machine side is interposed between the electric machine and the driven shaft, said shifting element coupling the electric machine to the driven shaft in a first shift position and decoupling the electric machine from the dual clutch transmission in a neutral position,
    wherein the shifting element on the electric machine side is shiftable into a second shift position in which the electric machine is coupled to one of the input shafts and decoupled from the driven shaft.

2. The hybrid drivetrain according to claim 1, wherein the intermediate gear comprises a planetary gear stage and/or a spur gear stage separate from the gear stages.

3. The hybrid drivetrain according to claim 1, wherein the shifting element on the electric machine side is arranged on the driven shaft, and in that the shifting element on the electric machine side is shiftable from the neutral position either into the first shift position in a first axial direction or into the second shift position in a second axial direction which is opposite to the first axial direction.

4. The hybrid drivetrain according to claim 3, wherein the shifting element on the electric machine side directly and axially adjoins in the axial direction a wheel plane on the electric machine side, forming a gear stage, which comprises an idler gear on the output side, mounted on the driven shaft, and the idler gear on the output side of the wheel plane on the electric machine side is coupled in the second shift position to the electric machine to provide an electric machine connection to the input shaft on the electric machine side.

5. The hybrid drivetrain according to claim 4, wherein the output-side idler gear of the wheel plane on the electric machine side is coupleable to the driven shaft for a gear shifting by means of an associated gear-shifting element.

6. The hybrid drivetrain according to claim 1, wherein the first subtransmission and the second subtransmission are arranged next to each other axially, and the first subtransmission is spaced axially apart from the dual clutch with the second subtransmission interposed in between, and/or the input shaft on the electric machine side is a solid shaft, arranged coaxially inside the second input shaft, which is designed as a hollow shaft.

7. The hybrid drivetrain according to claim 6, wherein the driven shaft is prolonged in an axial prolongation beyond the first subtransmission by an end piece, on which the shifting element on the electric machine side is mounted, and the end piece is coupled to the electric machine in the first shift position of the shifting element on the electric machine side.

8. The hybrid drivetrain according to claim 1, wherein the shifting element on the electric machine side is arranged axially flush between the outer wheel plane on the electric machine side and the intermediate gear of the electric machine, and/or all the wheel planes are arranged axially in succession in the dual clutch transmission, and the dual clutch is arranged on an axially outer end of the transmission and the electric machine is arranged on the axially opposite end of the transmission.

9. The hybrid drivetrain according to claim 1, wherein the electric machine is arranged with its electric machine shaft coaxial to the input shaft on the electric machine side or coaxial to the driven shaft.

10. The hybrid drivetrain according to claim 1, wherein the intermediate gear comprises a planetary gear stage with a sun wheel and a radially outer ring gear and planet gears arranged in between.

11. The hybrid drivetrain according to claim 9, wherein the electric machine shaft is a hollow shaft, which is coaxially mounted on the driven shaft.

12. The hybrid drivetrain according to claim 10, wherein the sun wheel is fixed in rotation on the electric machine shaft and the radially outer ring gear is fixed to the housing, and in the first shift position of the shifting element on the electric machine side an arm carrying the planet gears is coupled to the driven shaft, and in the second shift position of the shifting element on the electric machine side the arm carrying the planet gears is coupled to the output-side idler gear of the wheel plane on the electric machine side.

13. The hybrid drivetrain according to claim 2, wherein the shifting element on the electric machine side is arranged on the driven shaft, and in that the shifting element on the electric machine side is shiftable from the neutral position either into the first shift position in a first axial direction or into the second opposite shift position in a second axial direction which is opposite to the first axial direction.

14. The hybrid drivetrain according to claim 2, wherein the first subtransmission and the second subtransmission are arranged next to each other axially, and the first subtransmission is spaced axially apart from the dual clutch with the second subtransmission interposed in-between, and/or the input shaft on the electric machine side is a solid shaft, arranged coaxially inside the second input shaft, which is designed as a hollow shaft.

15. The hybrid drivetrain according to claim 3, wherein the first subtransmission and the second subtransmission are arranged next to each other axially, and the first subtransmission is spaced axially apart from the dual clutch with the second subtransmission interposed in-between, and/or the input shaft on the electric machine side is a solid shaft, arranged coaxially inside the second input shaft, which is designed as a hollow shaft.

16. The hybrid drivetrain according to claim 4, wherein the first subtransmission and the second subtransmission are arranged next to each other axially, and the first subtransmission is spaced axially apart from the dual clutch with the second subtransmission interposed in-between, and/or the input shaft on the electric machine side is a solid shaft, arranged coaxially inside the second input shaft, which is designed as a hollow shaft.

17. The hybrid drivetrain according to claim 5, wherein the first subtransmission and the second subtransmission are arranged next to each other axially, and the first subtransmission is spaced axially apart from the dual clutch with the second subtransmission interposed in-between, and/or the input shaft on the electric machine side is a solid shaft, arranged coaxially inside the second input shaft, which is designed as a hollow shaft.

18. The hybrid drivetrain according to claim 2, wherein the shifting element on the electric machine side is arranged axially flush between the outer wheel plane on the electric machine side and the intermediate gear of the electric machine, and/or all the wheel planes are arranged axially in succession in the dual clutch transmission, and the dual clutch is arranged on an axially outer end of the transmission and the electric machine is arranged on the axially opposite end of the transmission.

19. The hybrid drivetrain according to claim 3, wherein the shifting element on the electric machine side is arranged axially flush between the outer wheel plane on the electric machine side and the intermediate gear of the electric machine, and/or all the wheel planes are arranged axially in succession in the dual clutch transmission, and the dual clutch is arranged on an axially outer end of the transmission and the electric machine is arranged on the axially opposite end of the transmission.

20. The hybrid drivetrain according to claim 4, wherein the shifting element on the electric machine side is arranged axially flush between the outer wheel plane on the electric machine side and the intermediate gear of the electric machine, and/or all the wheel planes are arranged axially in succession in the dual clutch transmission, and the dual clutch is arranged on an axially outer end of the transmission and the electric machine is arranged on the axially opposite end of the transmission.

* * * * *